Patented Sept. 24, 1929

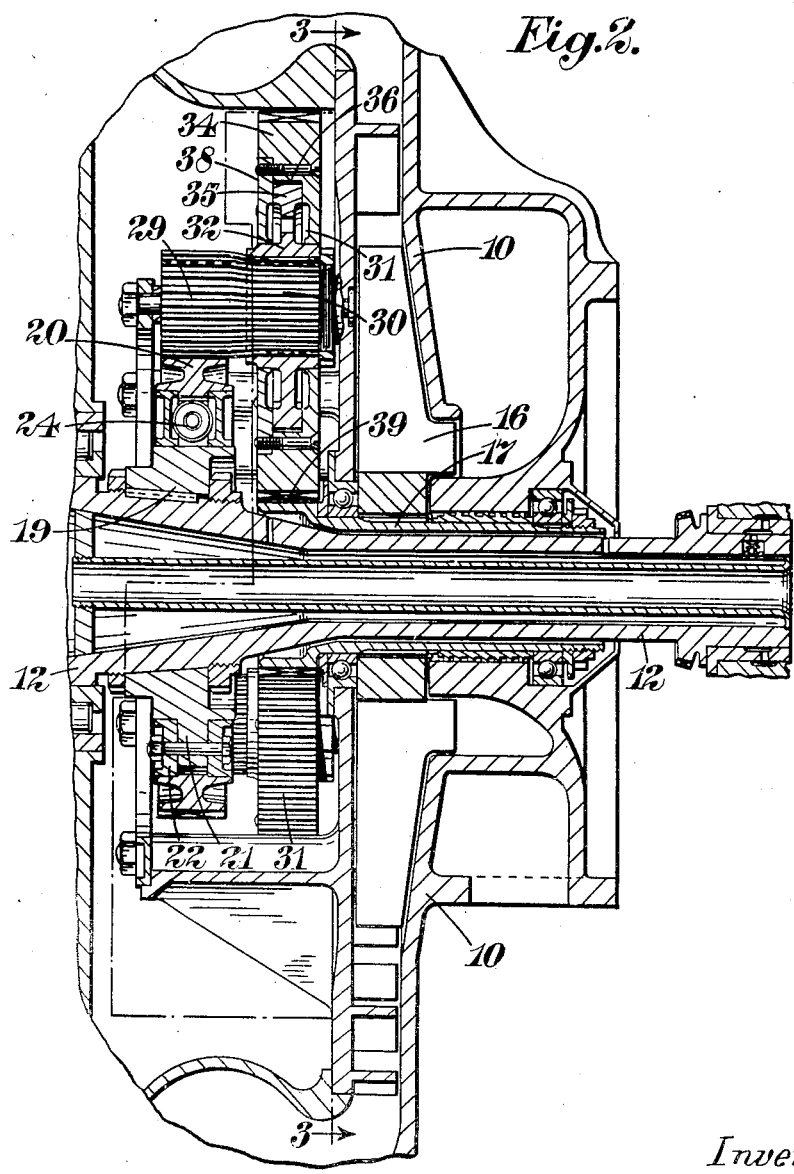

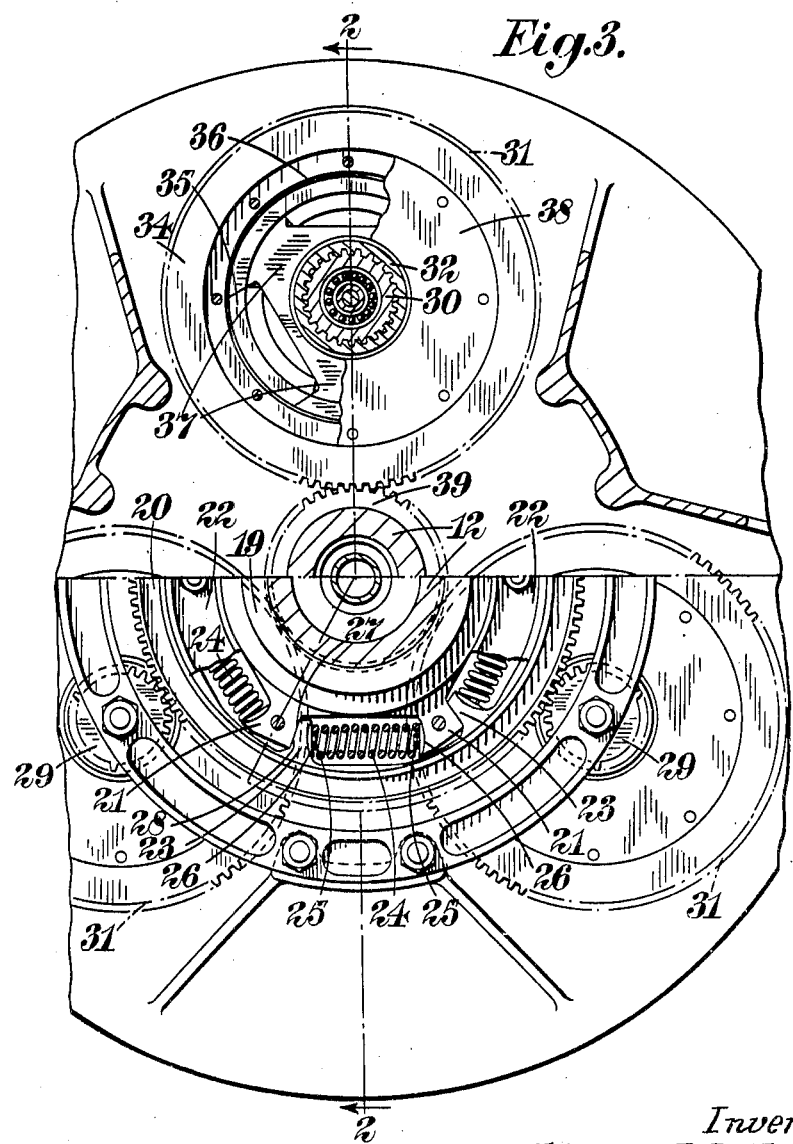

1,729,509

UNITED STATES PATENT OFFICE

ALFRED HUBERT ROY FEDDEN, OF BRISTOL, ENGLAND, ASSIGNOR TO THE BRISTOL AEROPLANE COMPANY, LIMITED, OF BRISTOL, ENGLAND, A BRITISH COMPANY

GEARING FOR DRIVING A ROTARY COMPRESSOR ON AN INTERNAL-COMBUSTION ENGINE

Application filed March 30, 1928, Serial No. 265,959, and in Great Britain April 6, 1927.

This invention is for improvements in or relating to gearing for driving a rotary compressor on an internal-combustion engine, such as is used for supercharging. It is usual to drive the rotor of the compressor at a speed considerably in excess of that of the engine crankshaft, and in these conditions the inertia effects of the rotor are large. This is immaterial when running at a constant speed, but it entails heavy loading of the transmission gearing when accelerating or decelerating, and it is the object of the present invention to provide a construction of gearing in which the risk of overloading and damage shall be avoided.

This invention accordingly comprises in transmission gearing for driving a rotary compressor on an internal-combustion engine, the combination in the gear train, of a centrifugal clutch device and a resilient driving connection. The centrifugal clutch device provides a slipping connection so that the load is taken up gradually, since the clutch becomes more firmly engaged as the speed rises, and the resilient driving connection relieves the transmission gearing of sudden shocks; in addition it is advantageous in that it separates the compressor from the crankshaft and avoids difficulties which might arise with regard to torsional vibration of the crankshaft.

This invention also comprises a construction of transmission gearing as above set forth constituted by a driving-wheel, a driven-wheel, and a double pinion engaging them respectively, with a resilient driving connection embodied in the driving-wheel and a centrifugal clutch device embodied in the double pinion, preferably in that part of it which engages the driven-wheel.

According to another feature of this invention, the resilient driving connection comprises a hub-member having an outwardly-extending radial projection, a rim having a corresponding inwardly-extending projection, and a compression-spring mounted between said projections to transmit the drive from the hub to the rim, this spring having at its ends curved pads engaging curved faces on the projections so that it can readily adjust itself to all conditions of running.

According to another feature of this invention, the hub and the rim aforesaid are provided each with a series of projections so disposed that each projection of a co-operating pair bears by its back-surface on a projection of the next pair, and the springs are of such stiffness that, when normal loads are being transmitted, the projections are not in contact.

This invention also comprises a method of constructing a double pinion, such as mentioned above, consisting in forming the teeth on the smaller pinion of a greater axial length than is required for the tooth-width of that part, forming internal teeth on the hub of the larger part, and engaging them coaxially with the teeth on the smaller part. Preferably, the tops of the interengaging teeth whereby the larger part of the pinion is mounted upon the smaller, are removed to reduce the height of the teeth, as by grinding.

This invention also comprises a double pinion constructed in the manner just described.

A particular embodiment of the invention will now be described, by way of example only, with the aid of the accompanying drawings, in which—

Figure 2 is a section through the compressor and transmission on the line 2—2 of Figure 3, and Figure 3 is a section of the parts shown in Figure 2 along the line 3—3 thereof.

Like reference numerals indicate like parts in all the figures of the drawings which are diagrammatic.

Figure 1:
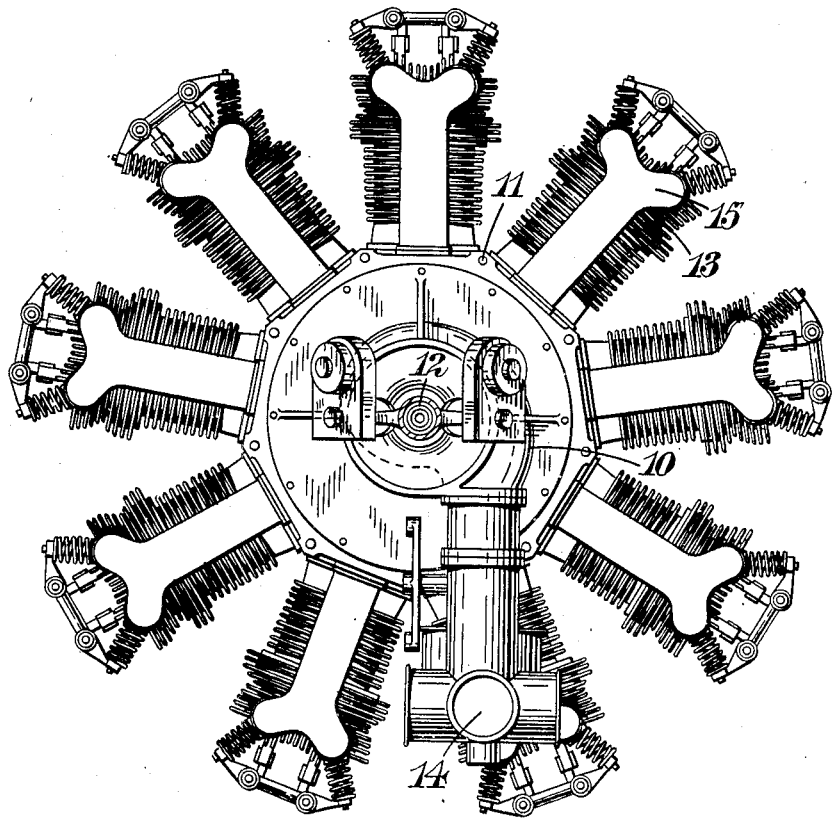
Figure 1 illustrates a radial cylinder internal-combustion engine and rotary compressor in which the present invention is embodied.

In the construction illustrated, a rotary compressor 10 is bolted to the crankcase 11 of a radial cylinder engine and surrounds the crankshaft 12 thereof; the compressor delivers the mixture from a carburettor 14 to separate induction-pipes 15, one for each of the cylinders 13. The rotor 16 of the compressor 10 is mounted on a hollow shaft 17 which also surrounds the crankshaft 12. This rotor-shaft 17 is driven from the crankshaft by three trains of gearing disposed symmetrically round the shaft-axis, these trains being identical with one another.

A driving gear-wheel is mounted on the crankshaft 12, and serves as the driving-wheel for each of the train of gears. A spring-drive is incorporated in the wheel by constructing it in separate parts 19, 20 of which the hub 19 is keyed or otherwise secured to the crankshaft. Referring to Figure 3, the hub 19 is provided with a series of radial projections 21, and two annular side-plates or rings 22 are secured on these projections to provide supporting means for a rim 20 coaxial with the hub 19. The rim 20 is free to move circumferentially on the side-plates in accordance with the requirements of the spring-drive, but not radially thereof. The rim member 20 is provided with inwardly-directed projections 23 which overlap in a radial direction the outward projections 21 on the hub, and a compression-spring 24 is situated between each projection on the hub and its cooperating projection on the rim. The spring 24 is provided at each end with a steel or other suitable pad 25 to take the thrust on the spring; the outer surfaces of these pads are curved, and the faces 26 of the projections on which they abut are similarly curved, so that the pads can readily adjust themselves to any variations in the length of the spring whilst still maintaining the thrust axially of the spring. The face 27 of the projection 21 bears against the face 28 of the projection 23 only during deceleration of the engine.

The springs 24 are preferably of such stiffness, that under a fluctuating torque, they yield, allowing the rim-member 20 to rotate relatively to the hub-member 19.

This elastic yield so reduces the effective torsional stiffness of the compressor drive, that its natural period of vibration is reduced below the running range, thus damping out torque fluctuations. In another application, the compressor drive may be made of such a suitable stiffness that the natural period of torsional vibration of the whole engine system may be reduced to a minimum.

The rim-member 20 is provided with spur-teeth on its outer circumference to engage one part 29 of a double pinion 29, 31. This double pinion is conveniently constructed in the following manner; a blank of a length not less than the width of two parts of the gear has the desired spur-teeth cut on it along its whole length, and over a portion 30 of its length the tops of these teeth are ground off (see Figure 2). The second element 31 of the double pinion has its hub 32 of sufficient size to encircle the teeth of the first part, and similar internal teeth 33 are formed in the hub of such depth as to fit the reduced teeth 30. The hub 32 is slid endwise on to the portion 30 of the first part 29 so that the two sets of teeth interengage with one another, locate the second part on the first part and provide a driving connection between them. This method of constructing a double pinion simplifies the machining operations and is very inexpensive whilst producing a satisfactory result.

The larger part 31 of the double pinion has a centrifugal clutch device embodied in it. The hub 32 and rim 34 are separate from one another, the rim part being carried on but free to rotate relatively, to the hub, and three radially-movable blocks or pads 35 are mounted on the hub in such manner as to be free to move into engagement with the inner surface 36 of the rim. The hub-member is of spider-like construction so that these blocks partake of its rotation, and has three radial arms 37 between which the blocks can slide radially, and as soon as a sufficiently high speed is reached, the blocks 35 are pressed outwards centrifugally against the rim 34 and transmit a frictional drive thereto. An annular cover-plate 38 bolted to the rim 34 holds it and the blocks 35 in position on the hub 32. It will be clear that the driving force which is transmitted increases as the speed increases, so that slipping can take place whilst the rotor is being accelerated, thereby relieving the gearing of the large forces involved in a very rapid acceleration. When, however, the maximum speed has been obtained the drive is transmitted without any slip since the maximum frictional effect is then operative.

This rim-member which receives the frictional drive is formed on its outer circumference with teeth to engage a gear-wheel 39 integral with the rotor-shaft 17, and since this rotor-shaft is coaxial with the crank-shaft 12 each of the trains of gearing terminates in this same wheel, and the drive is equalized as between the various trains.

Whilst a specific construction of gearing embodying coaxial driving and driven-shafts has been described, it is to be understood that the invention is not limited in this respect, for the broad features of it as described above may be applied to any compressor used for supercharging an internal-combustion engine.

I claim:

1. In transmission gearing for driving a rotary compressor on an internal-combustion engine, the combination of a driving wheel, a resilient driving connection embodied in said driving wheel, a double pinion, one part of which engages said driving wheel, a centrifugal clutch device embodied in said double pinion and a driven wheel engaging the second part of said double pinion.

2. In transmission gearing for driving a rotary compressor on an internal-combustion engine, the combination of a centrifugal clutch device, a hub-member, an outwardly extending radial projection on said hub-member, a rim mounted on said hub-member, a corresponding inwardly extending projection on said rim, a compression spring between said projections to transmit the drive from the hub-member to the rim, and curved pads mounted on the ends of said spring and engaging curved faces on the said projection.

3. In transmission gearing for driving a rotary compressor on an internal-combustion engine, the combination of a hub-member, having an outwardly-extending radial projection formed on said hub-member, a toothed rim mounted on said hub-member, a corresponding inwardly-extending projection, a compression spring between the said projections to transmit the drive from the hub to the rim, curved pads mounted on the ends of said spring and engaging curved faces on the projections, a double pinion, one part of which engages said toothed rim, a centrifugal clutch device embodied in said double pinion and a driven wheel engaging the second part of said double pinion.

4. In transmission gearing for driving the rotary compressor on an internal-combustion engine, the combination of a centrifugal clutch device, a hub-member and a rim mounted on said hub-member, each provided with a series of radial projections so disposed that each projection of a co-operating pair bears by its back-surface on the projection of the next pair, and compression springs between the projections on the hub-member and rim aforesaid to transmit the drive from the hub to the rim, which springs are of such stiffness that, when normal loads are being transmitted, the projections are not in contact.

5. In transmission gearing for driving a rotary compressor on an internal-combustion engine, the combination of a driving wheel, a resilient driving connection embodied in the driving wheels, a pinion engaging said driving wheel, of a greater axial length than is required for the tooth-width of the pinion, a larger pinion having an axial throughway in its hub, and internal gear-teeth formed on said hub, said internal teeth being engaged coaxially with the teeth on the first said pinion, a centrifugal clutch device embodied in said larger pinion, and a driven wheel engaging said larger pinion.

6. In transmission gearing for driving a rotary compressor on an internal-combustion engine the combination of a hub-member, an outwardly-extending radial projection formed on said hub-member, a toothed rim mounted on said hub-member, a corresponding inwardly extending projection, a compression spring between the said projections to transmit the drive from the hub to the rim, curved pads mounted on the ends of said spring and engaging curved faces on the projections, a pinion engaging said toothed rim, of a greater axial length than is required for the tooth-width of the pinion, a larger pinion having an axial throughway in its hub, and internal gear-teeth formed on said hub, said internal teeth being engaged coaxially with the teeth of the first said pinion, a centrifugal clutch device embodied in said larger pinion, and a driven wheel engaging said larger pinion.

7. The combination of an internal-combustion engine, a driving-wheel on the crankshaft thereof, a resilient driving connection embodied in said driving wheel, a double pinion, one part of which engages said driving wheel, a centrifugal clutch device embodied in said double pinion, a driven wheel engaging the second part of said double pinion, and a rotary compressor whereof the rotor is operatively connected to said driven wheel.

8. The combination of an internal-combustion engine, a hub-member, an outwardly-extending radial projection formed on said hub-member, a toothed rim mounted on said hub-member, a corresponding inwardly-extending projection, a compression spring between the said projections to transmit the drive from the hub to the rim, curved pads mounted on the ends of said spring and engaging curved faces on the projections, a pinion, engaging said toothed rim, of a greater axial length than is required for the tooth-width of the pinion, a larger pinion having an axial throughway in its hub, and internal gear teeth formed on said hub, said internal teeth being engaged coaxially with the teeth of the first said pinion, a centrifugal clutch device embodied in said larger pinion, a driven wheel engaging said larger pinion and a rotary compressor whereof the rotor is operatively connected to said driven wheel.

In testimony whereof I affix my signature.

ALFRED HUBERT ROY FEDDEN.